Oct. 18, 1932.    A. W. BERG    1,883,493
TRANSFERRING AND TRANSPORTING APPARATUS
Filed Aug. 3, 1929    2 Sheets-Sheet 2

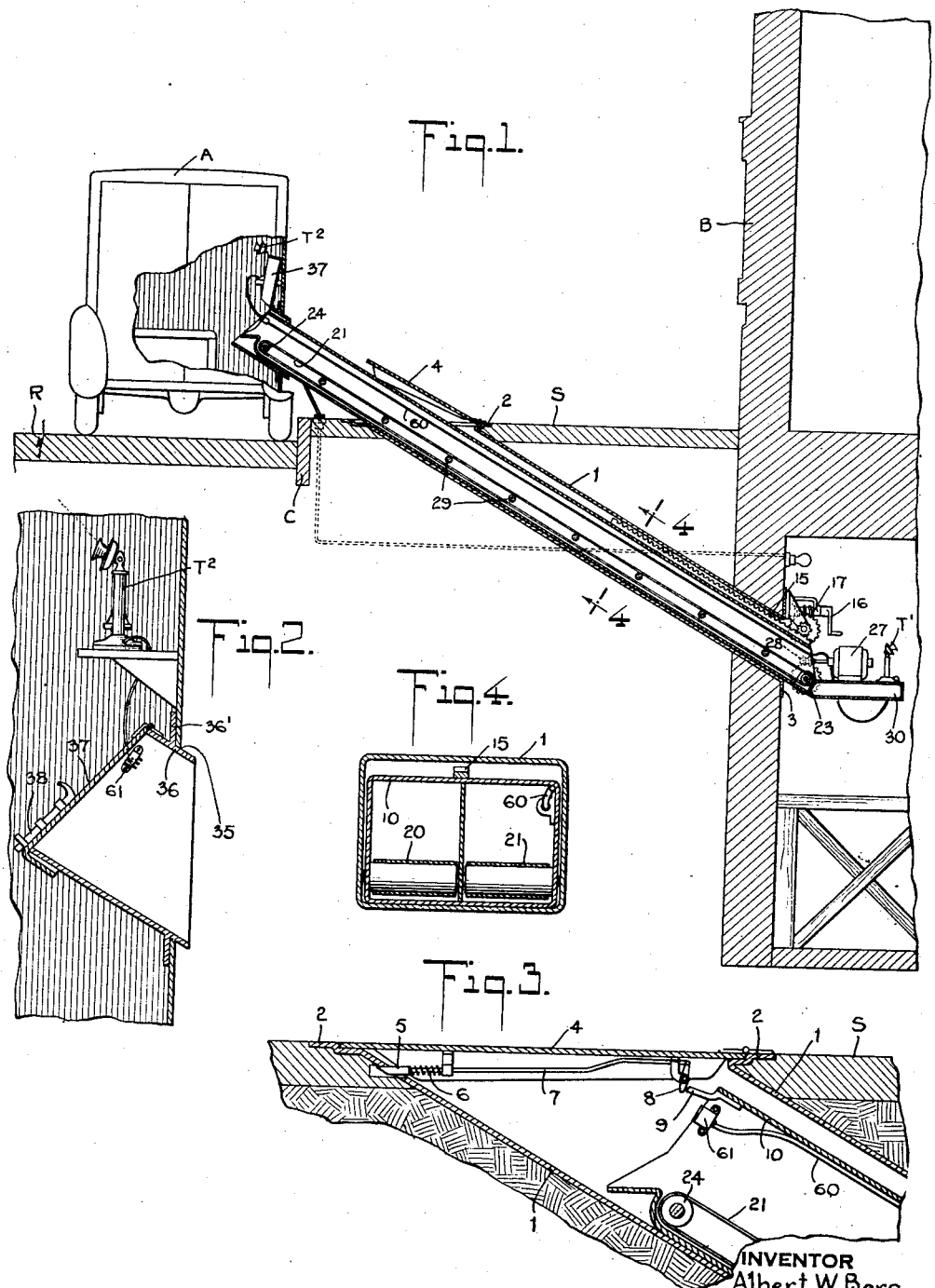

INVENTOR
Albert W. Berg
BY
*Cavanagh & James*
ATTORNEYS.

Patented Oct. 18, 1932

1,883,493

UNITED STATES PATENT OFFICE

ALBERT W. BERG, OF NEW YORK, N. Y.

TRANSFERRING AND TRANSPORTING APPARATUS

Application filed August 3, 1929. Serial No. 383,267.

This invention relates to transferring and transporting apparatus, and has particular application to novel and useful improvements in means for safely transporting and transferring valuables, such as bank funds, mail, merchandise, and the like.

In the present instance I have, by way of illustration, shown my invention as embodied in the form of an apparatus for transporting and transferring valuables to and from an establishment, such as a bank, but I wish it to be understood the invention is not limited in its application to this particular purpose, as it may be employed in any connection wherein its use may be found advantageous and desirable.

Because of the increased activity of criminals in the last decade or so it has become the practice of persons or companies wishing to transport valuables, such, for example, as mail, cash, jewelry, negotiable bank paper, and the like, to use armored automobiles heavily guarded, and when unloading or loading the cars, one or more guards must accompany packages into the bank or other building, while at least one guard must remain in the armored car. During the movements of the valuables from the car across the usual sidewalk and into the building, or from the building into the car, the guards are open to attack, and such attacks or raids are often successful, particularly in a large city, because of the crowd on the sidewalk and the consequent opportunity the criminals have to make a successful escape due to the ensuing confusion and excitement.

One of the objects of this invention is the provision of transferring or transporting means which will provide direct communication between a conveyance, such as an armored car, and the interior of a selected building, without the necessity of any member or members of the car crew leaving the latter for the purpose of transferring or protecting the transfer of the valuables from the car to the building.

A further object of the invention is to provide means whereby the arrival of the conveyance at the building for the purpose of delivering or removing valuables may be signaled to persons in the interior of the building without any member of the conveyance crew leaving the latter. Upon such signal the proper person within the bank may actuate suitable mechanism to form a closed and protected connecting passageway between the conveyance and the interior of the building to allow the delivery or removal of packages and articles, as will be more fully explained hereafter.

It is also my purpose to provide an apparatus which will embody the desired features of safety and efficiency, and through the medium of which the conveyance of packages or valuables between the conveyance and the building, or vice versa, may be accomplished rapidly and conveniently and with a maximum degree of protection, both to the valuables and to the operators, guards, or persons engaged in carrying out the work of transfer and transportation.

With the above recited objects and others of a similar nature in view, my invention consists in the construction, combination and arrangement of parts set forth in and falling within the scope of the appended claims.

In the accompanying drawings—

Fig. 1 is a sectional view in elevation of a conveyance, such as an armored automobile truck or car in position to communicate through the delivery device with the interior of a building.

Fig. 2 is a fragmentary side elevation in section of the door of the truck and part of the interior of the body thereof;

Fig. 3 is a fragmentary side elevation of the arrangement of the sidewalk door and locking means therefor which is adapted to be actuated by the conveyor chute;

Fig. 4 is a right sectional view taken through 4—4 of Fig. 1;

Figure 5:
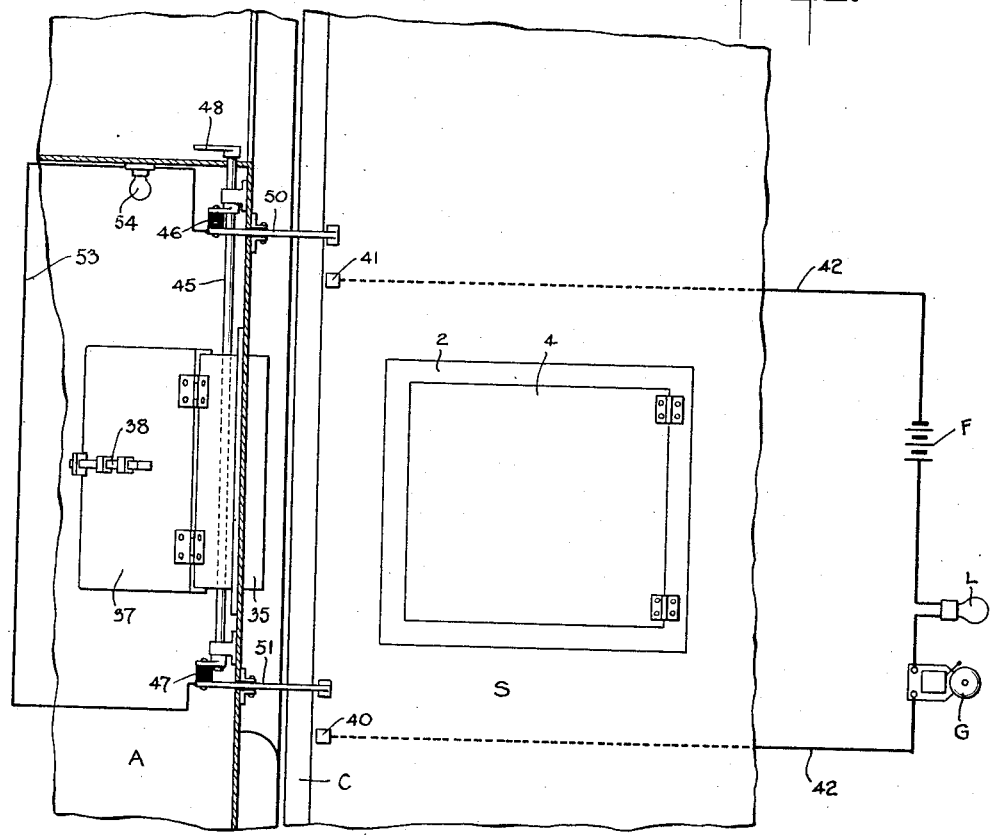
Fig. 5 is a plan view partly in section of the interior of the truck, the sidewalk door and the signaling circuit.
Figure 6:
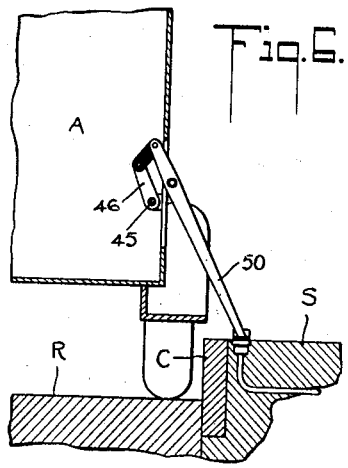
Fig. 6 is a detail of the contacting device partly in section.
Figure 7:
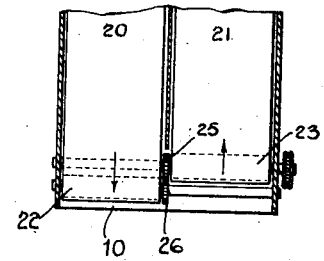
Fig. 7 is a detail illustrating the arrangement of the conveyor belts adapted to travel in opposite directions.

Referring to the drawings and especially thereto constitute electric conductors and are adapted to close the electric circuit through the bell G, battery F and light L, when the arms are brought into contact with the plates 40—41.

A telephone communicating system is also provided and is here shown conventionally as made up of telephone $T^1$ within the building, and telephone $T^2$ within the truck. The telephone $T^2$ herein is connected through a suitable conductor with the contact 61 located within the chute head, as shown in Fig. 2, while 61' is a companion contact fastened to the outer end of the movable casing 10 and forms a terminal for the conductor wire 60 connected in circuit with the telephone $T^1$ at the building end.

Thus, when the movable casing is actuated and projected into the chute head 36 of the truck, its maximum distance, the contact 61' carried by the casing 10, is brought into engagement with the contact 61, and the circuit is closed between the two telephones.

In operation the truck or car A drives up to the curb and positions itself opposite to the plates imbedded in the sidewalk so that when the movable contact arms 50—51 are dropped they will contact with the plates 40—41 and form a closed circuit through the signaling apparatus in the building and on the truck and thus notify the occupants of the building of the arrival of the truck and the readiness to transfer articles from or to the building, and also through the signal light 54, inform the occupants of the truck that the latter is in proper position to transfer the valuables. The operator in the building then rotates crank 16 which actuates the rock and pinion mechanism which slides casing 10 upwardly so that arm 9 trips lever 8 and opens bolt 5 so that continued movement of casing 10 in an upward direction forces door 4 upwardly into its open position. An alarm bell may be connected to the door to warn passersby of the opening.

Such an alarm is quite generally used in sidewalk doors such as those over elevator shafts. Upon continued movement of sliding casing 10 it will project upward through the sidewalk and enter the chute head 36 in the truck body until the contact 61' on the casing engages the contact 61 in the chute head. When such contact is made the telephone circuit is closed, sounding the telephone bell, within the truck, and the truck occupant may converse with the operators within the building, and having ascertained that all is in readiness for the transfer of the packages or valuables, will then unlatch the bolt 38 and lift the hinged door 37 covering the inner end of the chute head. Then, when motor 27 is started belts 20 and 21 begin to move in opposite directions, one adapted to carry articles from the building to the truck, and one adapted to carry them from the truck to the building. Of course it is obvious that only one belt may be used. Driven by a reversible motor, this would produce an exchange in only one direction at a time but would allow larger packages to be transmitted through the same size casing 10. After the desired articles are exchanged the casing is withdrawn by the operator in the building and door 4 falls into place and is locked by spring bolt 5.

While I have herein shown and described one embodiment of my invention, I wish it to be understood that I do not confine myself to all the precise details herein set forth by way of illustration, as modification and variation may be made without departing from the spirit of the invention or exceeding the scope of the appended claims.

For example, it will be understood that other types of conveying mechanism than an endless belt conveyor may be employed, and any suitable sort of power mechanism may be utilized for actuating the conveying mechanism as well as the sliding casing. It will also be understood that the invention is not limited to the use of automobile trucks, but is adapted to be employed in connection with any suitable sort of conveyance. It will further be understood that if desired, the arrangement of the apparatus might be reversed. In other words, instead of having the conveyors operated from within the building, a relatively short conveying apparatus might be mounted upon the truck of conveyance and operated therefrom to be projected into a manhole or opening in the sidewalk or in the wall of the building, and the goods conveyed between the truck and the building, as described in the form of the device shown herein. Of course, as will be readily appreciated, the conveying mechanism adapted to be used between the building and the truck may be wired into the usual alarm or protective system of the building itself.

What I claim is:

1. In an apparatus for transferring valuable articles between a building and an armored traveling vehicle, a communicating closed and armored casing adapted to be projected from said building into operating contact with said vehicle, and a plurality of endless belt conveyor means within said casing adapted to transfer articles between the building and vehicle simultaneously in opposite directions.

2. In an apparatus for transferring articles between a building and a traveling vehicle, a metal tubular member imbedded under the sidewalk and communicating with the interior of the building at one end and with an opening in the sidewalk at the other, a door for said opening, a conveyor casing slidable in said tubular member and adapted to be moved upwardly through the opening in the sidewalk and into operating contact with said vehicle.

3. In an apparatus for transferring articles between a building and a traveling vehicle, a tubular member imbedded under the sidewalk and communicating with the interior of the building at one end and with an opening in the sidewalk at the other, a conveyor casing slidable in said tubular member and adapted to be moved upwardly through the opening in the sidewalk and into operating contact with said vehicle and a door for the opening in the sidewalk adapted to be opened and closed by the movement of said conveyor casing.

4. In an apparatus for transferring valuables between a building and an armored traveling conveyance, an integral rigid tubular armored casing of generally rectangular cross section adapted to be longitudinally reciprocated to form a communication between the building and the conveyance, article carrying means including a relatively flat wide endless belt conveyor system both the top and bottom belt portions of which are located near the bottom of the casing and are completely housed within and protected by the said casing, and means for reciprocating the casing to establish communication between the building and the conveyance.

Signed at New York city, in the county of New York and State of New York this 30th day of July, A. D. 1929.

ALBERT W. BERG.